Nov. 27, 1928.
W. W. WILLIAMS
COTTON DISTRIBUTOR
1,693,188
Original Filed Nov. 17, 1926  2 Sheets-Sheet 2
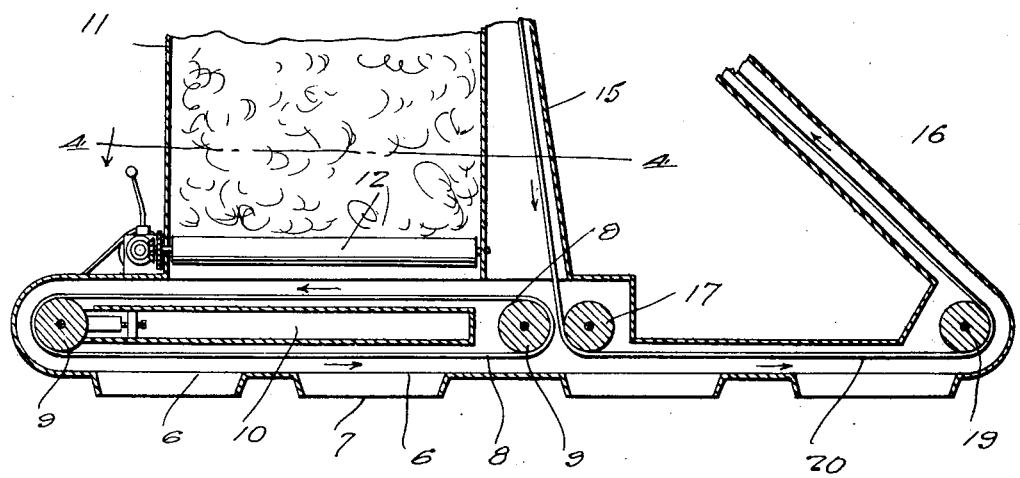
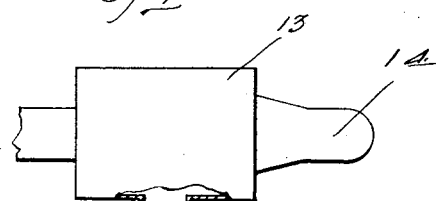
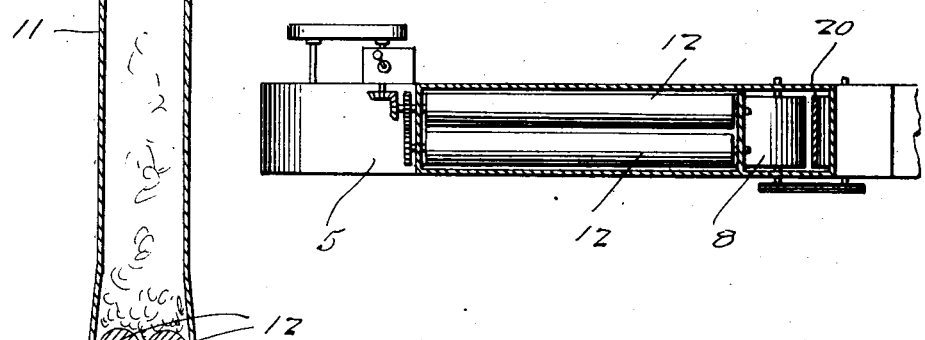
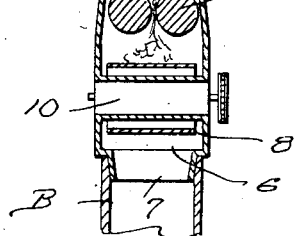
Inventor
William Wallace Williams
By Clarence A O'Brien
Attorney Patented Nov. 27, 1928.

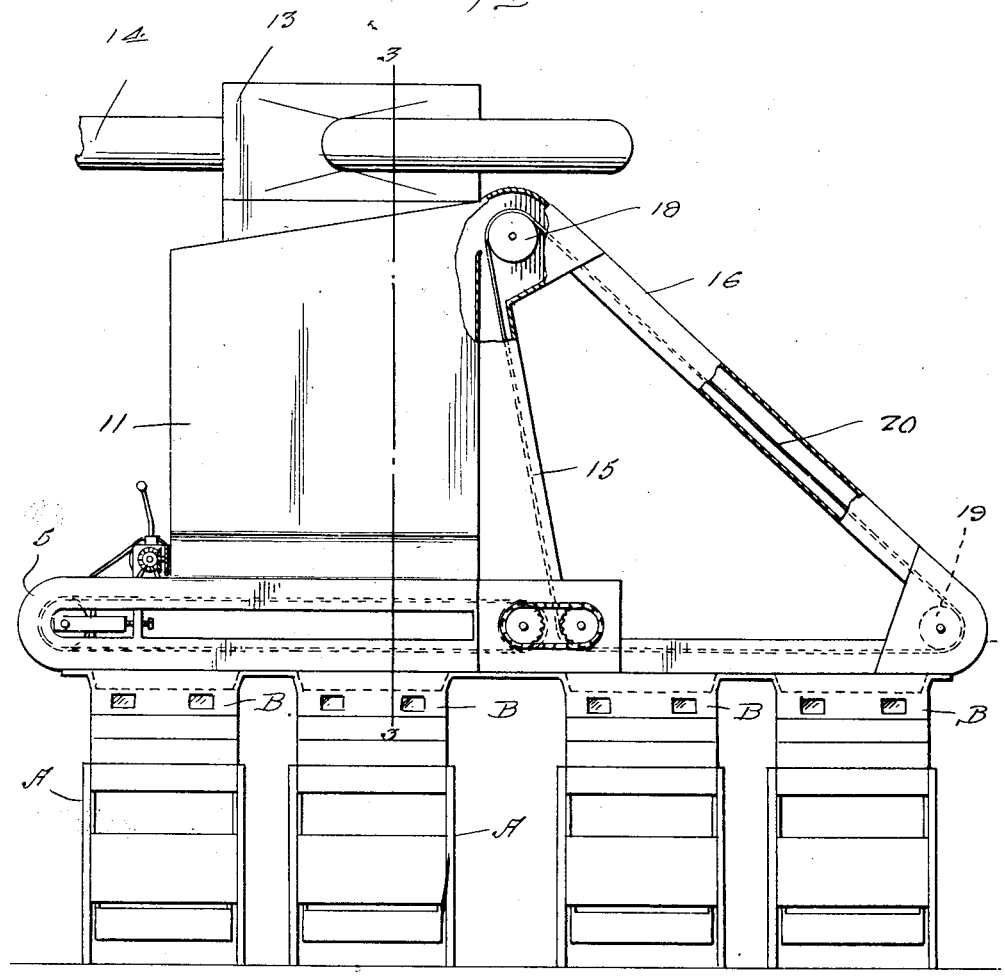

1,693,188

UNITED STATES PATENT OFFICE.

WILLIAM WALLACE WILLIAMS, OF LUBBOCK, TEXAS.

COTTON DISTRIBUTOR.

Application filed November 17, 1926, Serial No. 148,887. Renewed September 1, 1928.

This invention relates to a cotton distributor for a battery of gin stands, and has for its primary object to provide such a structure wherein any cotton distributed to the stands by the distributors not taken into the stands will be automatically returned to the storage bins and not become deposited upon the floor of the gin house as in the use of the generally conventional distributors now universally used.

It is well known in the cotton industry that the seed cotton, after being passed through the cleaner and supply device is conveyed to the gin feeders, and after they are fully supplied, the surplus of cotton not received by the gin feeders is dropped to the floor of the gin house at the end of the battery of gin stands, thus necessitating the picking up of this surplus cotton, usually by suction after the wagon is unloaded, and again running it through the cleaner and distributor to the battery of gins.

Obviously, this is very impractical and occasions the waste of a considerable amount of time and labor. Also, it is extremely detrimental to the cotton to be passed through the cleaner more than once as such additional cleaning operation will tear and otherwise injure the fibers.

In overcoming this great disadvantage, I have provided a highly novel, simple and efficient cotton distributing device that may be readily installed in a gin house in association with a battery of gin stands, and that will positively return to the storage bin any surplus cotton not accepted by the gin feeders.

In the drawings wherein like reference characters indicate corresponding parts throughout the several views:

Figure 1 is an elevation of a cotton distributor constructed in accordance with the present invention, the same being disclosed as actually associated with a battery of gin stands.

Figure 2 is a fragmentary longitudinal section of the distributing mechanism per se.

Figure 3 is a detail vertical section taken substantially upon the line 3—3 of Figure 1, and Figure 4 is a horizontal section taken substantially upon the line 4—4 of Figure 2, and looking downwardly in the direction of the arrows.

Now having particular reference to the drawings, there is disclosed in Figure 1 a battery of gin stands usually four in number, and each of which is designated generally by the reference character A, and constructed at its upper end with the usual feeder construction B. The distributor per se comprises a closed and relatively elongated conveyor belt housing 5 arranged in horizontal position above the stands A and having cotton outlet openings 6 in the bottom wall thereof similar in number to the number of the gin stands, and in equal spaced relation therewith. These openings are provided at their edges with depending tapered flanges 7 forming outlet necks telescoping into within the feeders B of said gin stands.

At one end of the conveyor housing, the same is of enlarged vertical sectional area within which is arranged an endless feeding belt 8 trained around pulleys or rollers 9—9, one of which is adjustable as indicated in Figures 1 and 2. The flights of this feeding belt 8 are separated by an elongated box-like partition 10 formed integrally with the enlarged area of the housing and being open at its opposite sides so as to permit of the adjustment of the adjustable belt roller.

Formed or otherwise disposed upon the top side of the enlarged area of the conveyor housing is a storage hopper 11 having communication with the interior of the housing as indicated in Figures 2 and 3, and within the lower ends of which is the usual pair of feeding rolls 12—12. The upper end of this storage bin 11 is equipped with opening to receive cotton from usual dropper or cleaner.

Located at one end of the hopper 11, and the conveyor belt housing, is a part of the structure, which may be conveniently defined as a triangular belt enclosure. This is adapted to accommodate a triple flight belt 20. The enclosure comprises a substantially vertical branch 15 which communicates at its upper end with the corresponding end of the hopper. It also includes downwardly inclined branch portions 16, and these branch portions connect with a horizontal bottom portion which, as is shown, is provided with longitudinally spaced discharge for outlet necks for stuffing into the complemental gin stand feeders. Suitably mounted in the enclosure in the corner portions we find pulleys 17, 18 and 19, over which the belt 20 is trained.

Obviously as the seed cotton is discharged from the storage bin 11 by the feeding rolls 12—12 the same will pass upon the upper flight of the endless belt 8, and be carried through the conveyor housing in the direction of the arrows so as to be discharged through the openings 6—6 directly beneath this conveyor. As soon as the cotton passes beyond this belt 8 it will be picked up by the belt 20 so as to be discharged through the remaining cotton exhaust openings. Any surplus cotton not accepted by the gin stand feeders will be conveyed upwardly through the housing 16 and thence dumped into the upper end of the storage bin 11, and be again carried to the gin stands in a manner as previously described.

It will thus be seen that I have provided a highly novel, simple and efficient cotton distributing mechanism for gin stands that is well adapted for all the purposes heretofore designated, and even though I have herein shown and described the invention as consisting of certain detail structural elements it is nevertheless to be understood that some changes may be made therein without effecting the spirit and scope of the appended claim.

Having thus described the invention, what I claim as new and desire to secure by Letters Patent is:—

A cotton distributor constructed for disposition between a conventional pneumatic cleaner and supply device, and a battery of gin stands including the customary feeders on the upper ends thereof, said distributor comprising a horizontally elongated belt housing, the bottom of said housing being equipped with longitudinally spaced outlet necks adapted to fit telescopically in the upper ends of said feeders, pulleys located in said housing, an endless belt trained over said pulleys, a substantially open triangular belt enclosure at one end of said housing adapted to accommodate a triple flight belt, a triple flight belt having its several flights arranged for movement in the respective angular portions of said triangular enclosure, the base of the enclosure being provided with additional outlet necks for cooperation with complemental feeders, a vertically disposed storage hopper rising from said housing and abutting said triangular enclosure and in communication with said housing and enclosure, the upper end of said hopper being constructed for connection with the aforesaid cleaning device.

In testimony whereof I affix my signature.

WILLIAM WALLACE WILLIAMS.